(No Model.)
3 Sheets—Sheet 1.
W. M. JACKSON.
METRICAL CARBURETOR.
No. 249,363.
Patented Nov. 8, 1881.
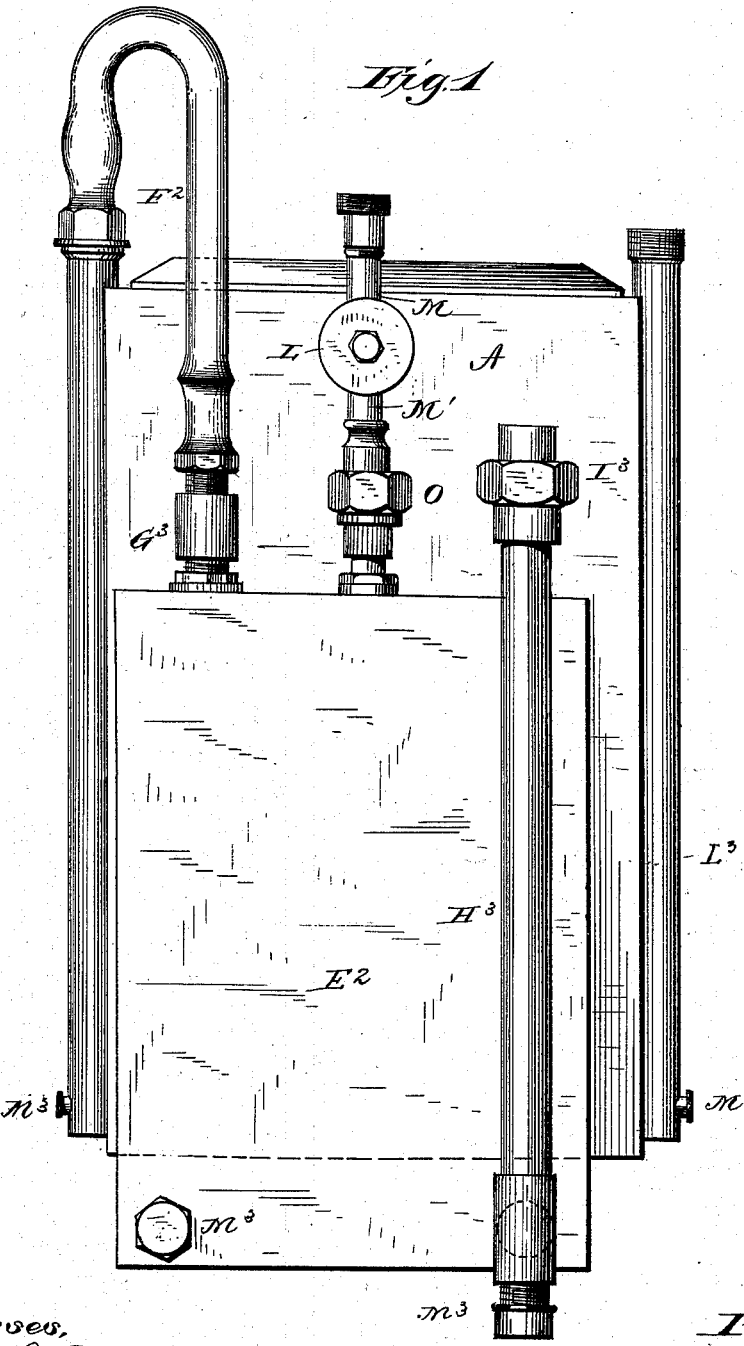

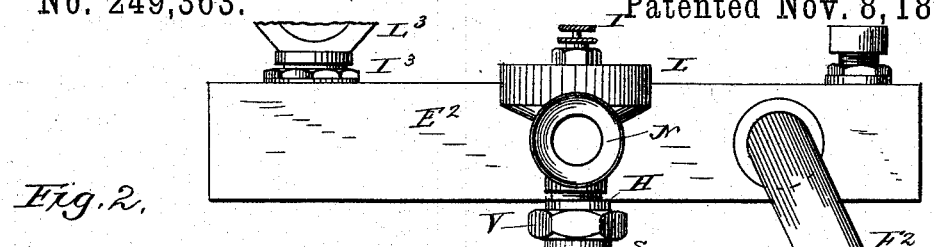
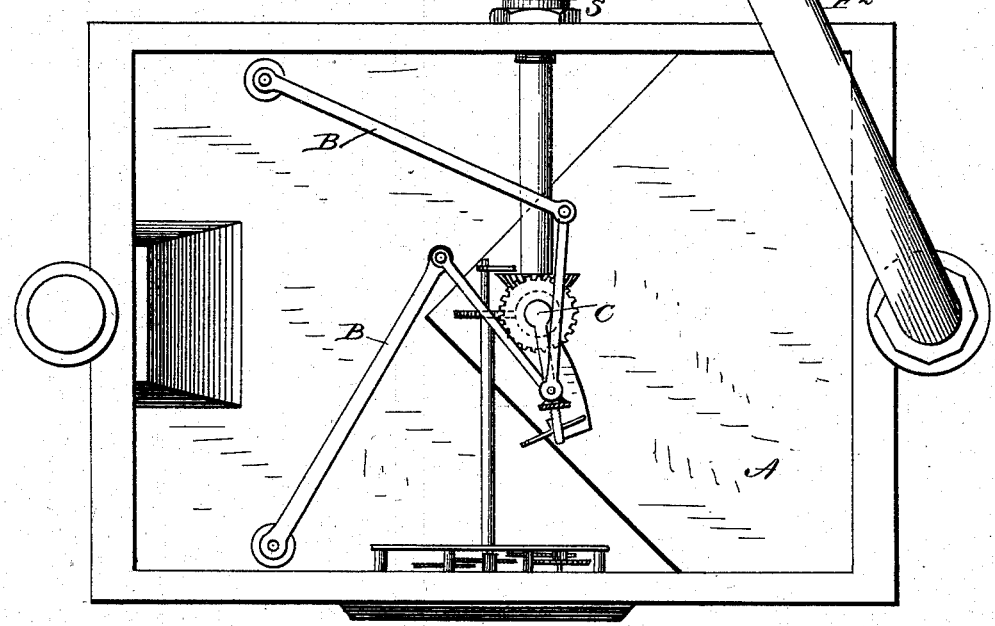
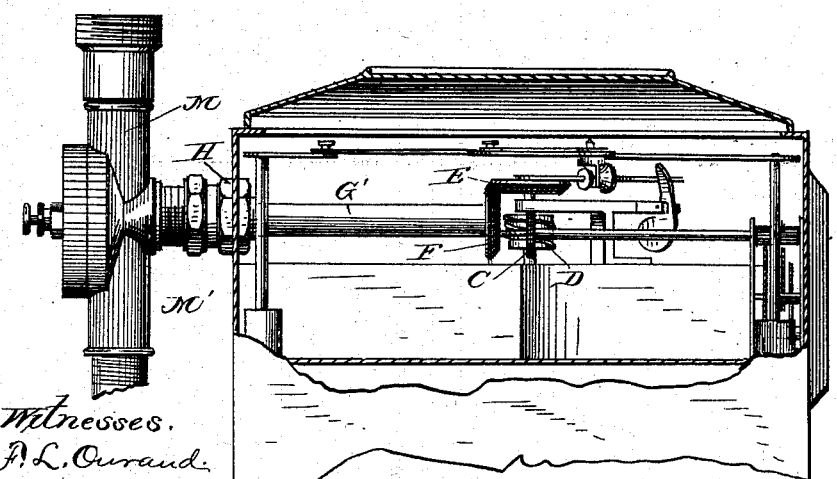

(No Model.) 3 Sheets—Sheet 3.

W. M. JACKSON.
METRICAL CARBURETOR.

No. 249,363. Patented Nov. 8, 1881.

Witnesses.
A. L. Ourand.
J. J. McCarthy.

Inventor.
W. M. Jackson
By C. M. Alexander
Attorney

UNITED STATES PATENT OFFICE.

WALTER M. JACKSON, OF PROVIDENCE, RHODE ISLAND.

METRICAL CARBURETOR.

SPECIFICATION forming part of Letters Patent No. 249,363, dated November 8, 1881.

Application filed August 6, 1881. (No model.)

*To all whom it may concern:*

Be it known that I, WALTER M. JACKSON, of Providence, in the county of Providence, and in the State of Rhode Island, have invented certain new and useful Improvements in Metrical Carburetors; and I do hereby declare that the following is a full, clear, and exact description thereof, reference being had to the accompanying drawings, and to the letters of reference marked thereon, making a part of this specification.

This invention relates to an improved metrical carburetor or apparatus for carbureting gas or air; and it has for its objects to provide certain means whereby the volume of gas or air passing through the apparatus may be made to automatically control the carbureting of such gas or air, as more fully hereinafter specified.

It is well known that if a current of gas or air be passed over or through a volatile hydrocarbon the evaporation of the hydrocarbon is accompanied by a loss of its heat, and its temperature is rapidly reduced. The evaporation and refrigeration thus produced cause a concentration of the hydrocarbon, which ultimately seriously interferes with the carbureting process. I have discovered by experience that by exposing a thin film of hydrocarbon liquid to the action of gas or air its evaporation is accomplished before it has time to refrigerate and concentrate, and that by constantly renewing the hydrocarbon and exposing it in thin films to the gas or air, that the carbureting is rendered thorough and perfect.

My invention is designed to furnish a method and means whereby the hydrocarbon liquid in thin films may be exposed to the action of the gas or air and the quantity regulated by means of the volume of gas or air to be carbureted. To this end my invention consists in certain improvements in apparatus whereby the volume of gas or air flowing to the burner controls the quantity of carbureting fluid exposed to a passing current of gas or air, as more fully hereinafter specified.

Figure 4:
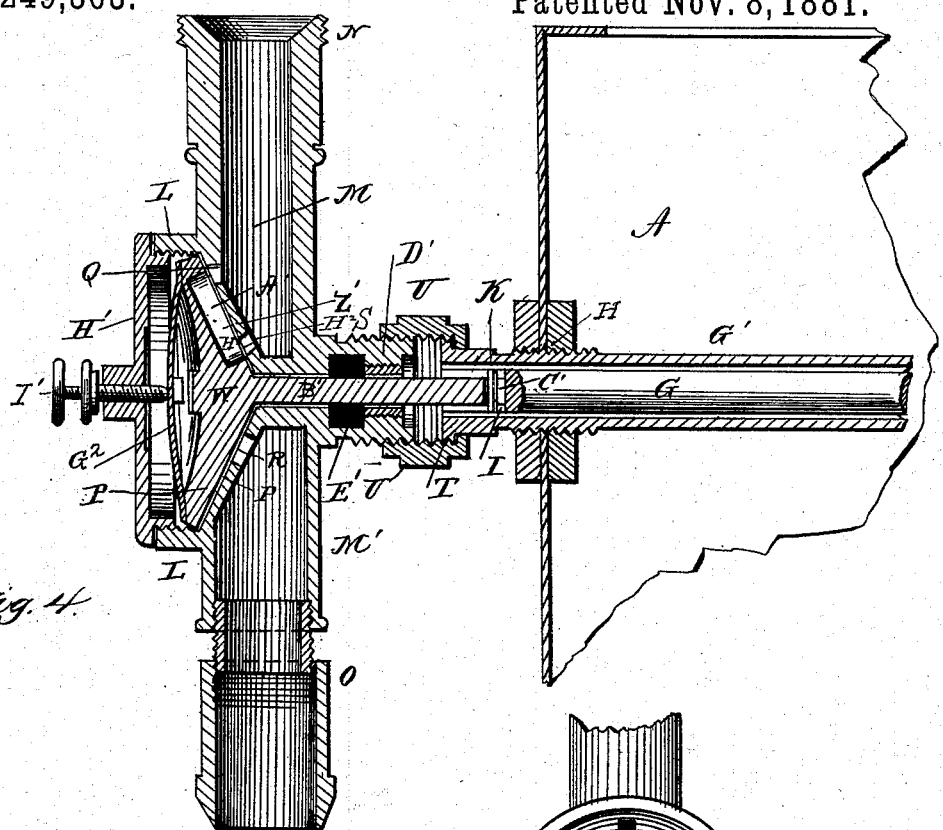
Figure 5:
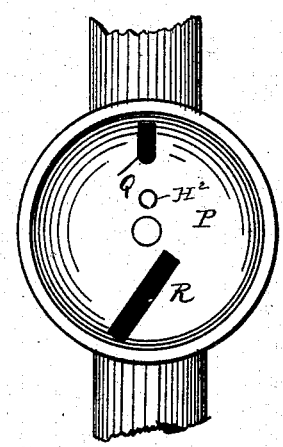
Figure 6:
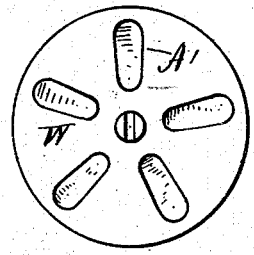
Figure 7:
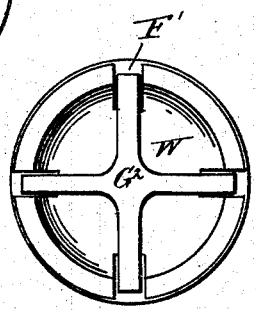
Figure 8:
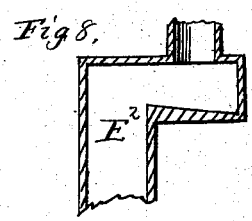

In the drawings, Figure 1 represents a rear elevation of my improved apparatus. Fig. 2 represents a top view of the same with the cover of the meter removed. Fig. 3 represents a vertical sectional view of the upper part of the meter and a side elevation of the hydrocarbon-distributing devices. Fig. 4 represents a sectional view of the valve and the spring for holding it to its seat. Fig. 5 represents a view of the valve detached, showing the face of the same. Fig. 6 represents a view of the valve-seat with the valve detached. Fig. 7 represents a sectional view of the valve and mechanism for automatically delivering the hydrocarbon fluid to the carburetor, and Fig. 8 represents a detached sectional view of the upper part of the carbureting-chamber.

The letter A indicates a gas measuring or indicating device, which may be of any suitable description, an ordinary gas-meter being represented in the present instance.

The letter B indicates the rods by means of which motion is transmitted from the flexible chambers or bellows of the meter to shaft C, which is provided with the usual worm, D, actuating the indicating mechanism. The shaft C, at its upper end, is provided with a miter-wheel, E, which intermeshes with a miter-wheel, F, mounted on the inner end of a horizontal shaft, G, journaled in a horizontal tube, G', supported at H to one of the walls of the meter and extending through the same. The said shaft, at its outer end, is provided with a recess, I, and a transverse pin, K, for the purpose hereinafter described.

The letter L indicates a cylindrical valve-casing, provided with disconnected pipes M M', having suitable couplings, N O, by means of which they may be secured, respectively, to tubes leading from a suitable reservoir and to the carburetor. The said valve-casing is provided with a conical valve-seat, P, having ports Q R, communicating respectively with the pipes M M'.

The letter S indicates a horizontal extension attached to the valve-casing. This is screw-threaded externally, and is adapted to be secured to the shoulder T on the outer end of the tube G' by means of a coupler, U.

The letter W indicates a valve provided with a conical face, Z', which sets against the conical seat of the valve-casing. The said valve, on its conical face, is provided with a series of chambers, A', for the purpose hereinafter specified. The said valve is provided with a shaft, B', which extends backward through the extension S, and is slotted, as indicated by the letter C', and is adapted to enter the recess in the shaft G and engage the pin K, so as to be rotated by said shaft.

The letter D' indicates a screw-threaded gland in the extension S, by means of which a packing, E', may be compressed around the shaft G to prevent the escape of the hydrocarbon fluid, as more fully hereinafter set forth. The outer face of the valve is made slightly concave, and is provided with recesses F', in which fit the ends of the radial spring $G^2$. The valve-casing is provided with a removable cap, H', which has an adjusting-screw, I', passing through its center, the inner end being pointed and bearing against the center of the radial spring in such manner that the pressure upon the valve may be regulated as required. The lower port, R, of the valve-casing is formed obliquely, as indicated, and the recesses in the valve are of given capacity and so arranged with respect to the two ports to supply a continuous flow of hydrocarbon from the reservoir to the carburetor as the valve is rotated. The valve-casing is provided with a small port, $H^2$, leading from the upper pipe, M, in such position as to communicate with the upper parts of the chambers in the valve as they successively connect with the port Q, and thus allow the hydrocarbon to escape through the said port Q to the carburetor, being replaced in the chambers by a suitable quantity of gas or air from the carburetor. This gas or air, as the chambers are successively brought into connection with the port Q, escapes through the same and bubbles up into the reservoir to create the necessary displacement to fill the next succeeding chamber without the admission of atmospheric air to the reservoir.

The letter $E^2$ indicates the carbureting-chamber. This is preferably formed of a rectangular box, and is connected with the eduction-pipe $F^2$ of the meter by means of a suitable coupling, $G^3$. The carburetor, however, may be in the form of a coiled pipe, or may be constructed in any other approved manner without departing from the spirit of my invention.

The letter $H^3$ indicates the eduction-pipe of the carburetor adapted to be connected by means of a suitable coupling, $I^3$, with ordinary service-pipe.

$L^3$ indicates the induction-pipe leading from the main to the meter, and $M^3$ the tap, by means of which the products of condensation may be drawn off from the meter and carburetor, should any of such collect. The shelf at the upper part of the carburetor has its bottom slightly elevated from the front to the rear, as indicated in Fig. 8 of the drawings, so as to insure the distribution of the carbureting material properly over the inner walls of the carburetor.

The operation of my invention will be readily understood in connection with the above description, and is briefly as follows: The distributing or delivering valve is rotated by the registering mechanism of the meter or measuring apparatus for the gas or air. As the said valve is rotated its chambers, which are of a determined capacity, are filled from the reservoir, and discharge their contents into the carburetor in direct ratio to the volume of gas consumed. The chambers may be made of any desired capacity, so as to distribute the carbureting fluid through the carburetor in a film of any required thickness, to be determined by the volatility or density.

As constructed, it will be perceived that there is a continuous uninterrupted flow of hydrocarbon fluid into the carburetor, which is essential when such fluid is exposed in a thin film, to secure uniform evaporation and a steady light of practically unvarying candle power.

Having thus fully described my invention, what I claim, and desire to secure by Letters Patent, is—

1. The feed mechanism, substantially as described, for supplying continuously a thin film of hydrocarbon to the carburetor, in combination with the meter and connecting operating mechanism, whereby the volume of gas or air flowing to the burner controls the quantity of carbureting fluid exposed to the passing current of gas or air.

2. In combination with the valve provided with recesses, as described, and the valve-casing provided with induction and eduction ports, the meter and connecting mechanism whereby the carbureting fluid may be supplied from a suitable reservoir to the carburetor continuously, substantially as specified.

3. The combination, in a metrical carburetor, of a single valve provided with recesses of a given capacity, and a valve-casing, in which said valve is adapted to rotate, the said valve-casing being provided with induction and eduction ports communicating with a supply-reservoir and a carburetor respectively, and suitable mechanism operating in conjunction with the metrical mechanism of the apparatus to supply the carburetor continuously with hydrocarbon in regulated quantities, substantially as specified.

4. In combination with the valve having a beveled, conoidal, or inclined face, and provided with suitable recesses, the valve-seat having an oppositely-beveled, conoidal, or inclined face, and provided with suitable induction and eduction ports and mechanism for operating the valve, substantially as specified.

5. In combination with a valve having a beveled, conoidal, or inclined face, and provided with recesses, as described, the valve-seat having a beveled, conoidal, or inclined face, and provided with suitable induction and eduction ports for the purpose of metrically supplying the hydrocarbon continuously from a suitable reservoir to the measured gas or air, substantially as specified.

6. The combination, with the valve and valve casing, of the valve-shaft slotted at its inner end, and the shaft of the actuating mechanism provided with a transverse pin, with which the slot is adapted to engage, and the actuating mechanism connected by suitable gearing with the measuring or indicating mechanism, substantially as and for the purposes specified.

7. The combination, with the valve-shaft and valve-casing, of a gland and packing whereby the carbureting fluid is confined to the valve-casing and prevented from escaping to the meter, substantially as set forth.

In testimony whereof I affix my signature in presence of two witnesses this 3d day of August, 1881.

WALTER M. JACKSON.

Witnesses:
J. J. McCARTHY,
H. AUBREY TOULMIN.